United States Patent
Guillemenet et al.

[11] Patent Number: 5,934,306
[45] Date of Patent: Aug. 10, 1999

[54] FUEL TANK FOR MOTOR VEHICLES

[75] Inventors: Mathieu Guillemenet, Esslingen; Roland Schirmer; Georg Georg, both of Stuttgart; Manfred Weil, Schorndorf; Hermann Horrer, Herrenberg; Dieter Scheurenbrand, Wolfschlugen; Manfred Stotz, Aichwald, all of Germany

[73] Assignee: Daimler-Benz A.G., Stuttgart, Germany

[21] Appl. No.: 08/972,281

[22] Filed: Nov. 18, 1997

[30] Foreign Application Priority Data

Nov. 20, 1996 [DE] Germany ............................ 196 47 957

[51] Int. Cl.⁶ ..................................................... F16K 24/04
[52] U.S. Cl. ............................................. 137/43; 137/202
[58] Field of Search ........................................ 137/43, 202

[56] References Cited

U.S. PATENT DOCUMENTS

| | | | |
|---|---|---|---|
| 3,428,078 | 2/1969 | Christopher | 137/202 |
| 4,655,238 | 4/1987 | Szlaga | 137/43 |
| 4,905,726 | 3/1990 | Kasugai et al. | 137/43 X |
| 4,991,615 | 2/1991 | Szlaga et al. | 137/202 X |
| 5,762,090 | 6/1998 | Halamish et al. | 137/202 X |
| 5,782,258 | 7/1998 | Herbon et al. | 137/43 |

FOREIGN PATENT DOCUMENTS

| | | |
|---|---|---|
| 2 658 453 | 8/1991 | France . |
| 4-201720 | 7/1992 | Japan ..................................... 137/202 |
| 1 103 835 | 2/1968 | United Kingdom . |
| 2 264 107 | 8/1993 | United Kingdom . |

*Primary Examiner*—Gerald A. Michalsky
*Attorney, Agent, or Firm*—Klaus J. Bach

[57] ABSTRACT

In a fuel tank for motor vehicles including a tank vent with a venting valve, which automatically closes when the fuel in the tank reaches a predetermined level and when the vehicle is in an upside down position, the venting valve includes a vent closing member and a float structure engaging to the vent closing member and having a buoyancy, which is variable depending on the amount of fuel contained in the tank.

6 Claims, 2 Drawing Sheets

FUEL TANK FOR MOTOR VEHICLES

BACKGROUND OF THE INVENTION

The invention resides in a fuel tank for motor vehicles including a venting valve, which automatically closes the tank vent depending on the fuel level in the tank and, by gravity if the motor vehicle is turned upside down.

Such fuel tanks are well known in the art and the venting valves used in connection with such tanks operate quite reliably. They prevent the entering of fuel into the vent line when the vehicle is negotiating curves and also when the vehicle is upside down during a roll-over accident. Although, in fuel tanks, the venting valves are generally arranged in the upper-most part of a tank and a possibly even in dome-like projections, it is difficult to protect the venting system from the results of over-filling the tank. It should be made sure that excessive filling of the tank is prevented and, in due time after completion of the filling procedure, communication is established with the vent system in order, for example, to prevent the tank from being subjected to excess pressures particularly at high ambient temperatures. This should even be true if the tank is filled to an extreme, for example, by the practice of adding in steps small amounts of fuel to "completely fill" the tank. In the tank designs presently in use, such a practice may keep the venting valve closed for an excessive period of time and may lead to an undesirable pressure build up in the tank.

It is the object of the present invention to provide a fuel tank with a venting system, which is not subject to such malfunctions, that is, a venting system, which provides for protection from excessive filling of the tank and which provides for the necessary venting of the tank.

SUMMARY OF THE INVENTION

In a fuel tank for motor vehicles including a fuel tank vent with a venting valve, which automatically closes when the fuel in the tank reaches a predetermined level and when the vehicle is in an upside down position, the venting valve includes a vent closing member and a float structure engaging the vent closing member and having a buoyancy, which is variable depending on the amount of fuel contained therein.

With such a floating element, the vent closing valve is first fully closed as the full float force of the float is effective. Subsequently, the float force becomes smaller as the float volume becomes successively smaller. Finally, the float acting on the vent closing valve no longer floats, but rather sinks whereby the vent valve is opened. The effective float volume is reduced by providing a float element, which slowly fills when it is submerged in the fuel. This can be achieved by bores extending through the wall of the hollow float and acting as throttles permitting the slow passage of fuel into the hollow float or by a float which includes, at least in a part of its wall, a structure with some permeability for fuel so that the float volume is slowly filled with fuel when the float is submerged.

As the float is more and more filled, the float volume decreases and the float finally sinks.

Since generally only a part of the float volume of the float is used and the float sinks only with a time delay after the tank is filled with fuel, the float is effective when the fuel level in the tank appears to rise momentarily, for example, when the vehicle is negotiating curves. The float rest volume is then effective even if the fuel level in the tank is still at maximum.

If the fuel level in the tank has dropped below this value, the fill level in the float also drops and its usable float volume increases accordingly since the fuel flows back out of the internal volume of the float element into the tank space.

A corresponding effect can be obtained if at least a part of the float element comprises a material which has an open pore or sponge-like structure such that the pores slowly fill up when the float element is submerged into the fuel but, on the other hand release the fuel when the fuel level falls.

Below, the invention will be described in greater detail on the basis of an embodiment thereof shown schematically in connection with a section of a fuel tank of a vehicle and a vent valve disposed in the tank.

DESCRIPTION OF THE PREFERRED EMBODIMENT

Figure 1:
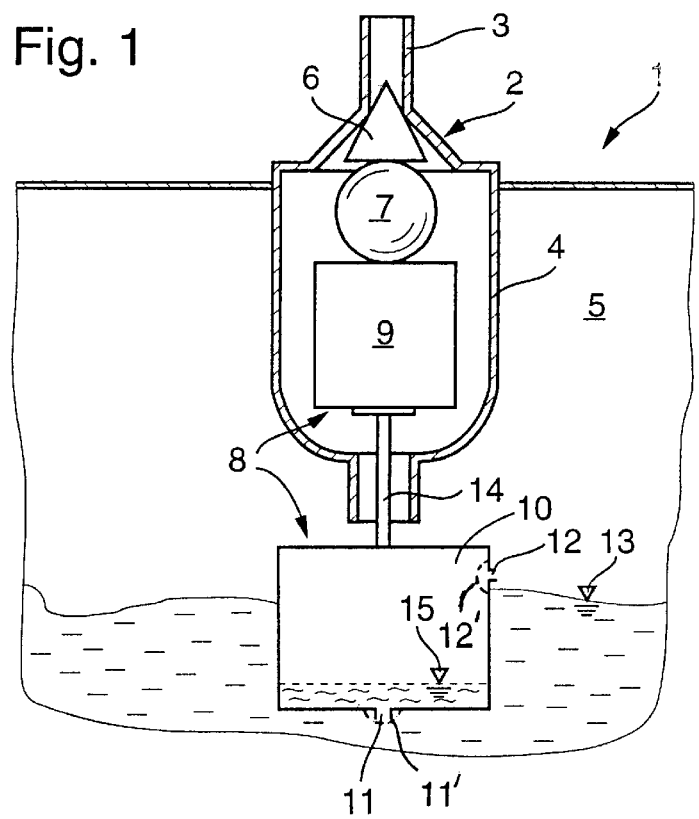
FIG. 1 shows a vent valve in a closed position for preventing over-filling of the tank.
Figure 2:
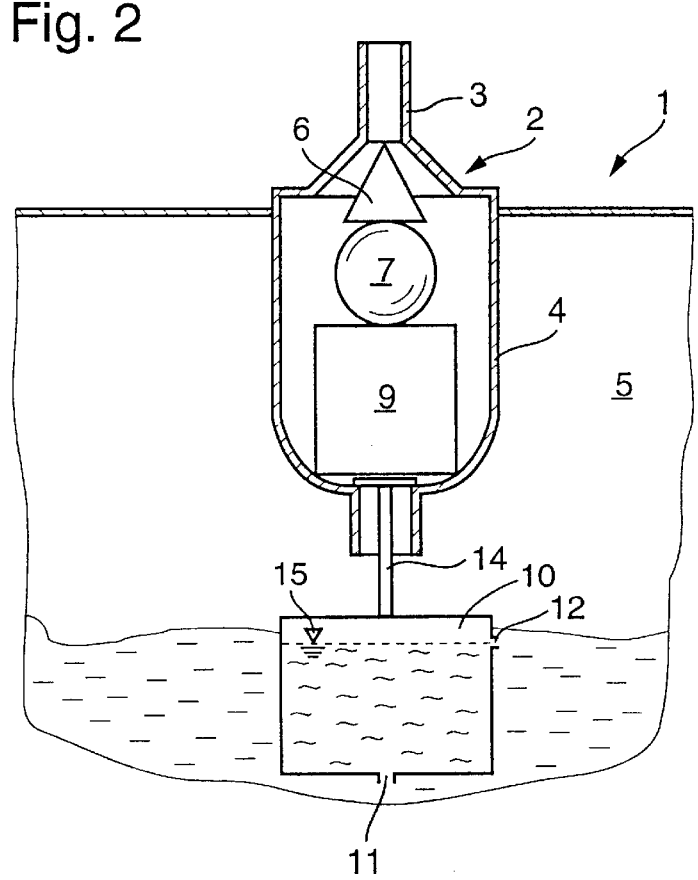
FIG. 2 shows the valve some time after completion of the tank filling procedure.
Figure 3:
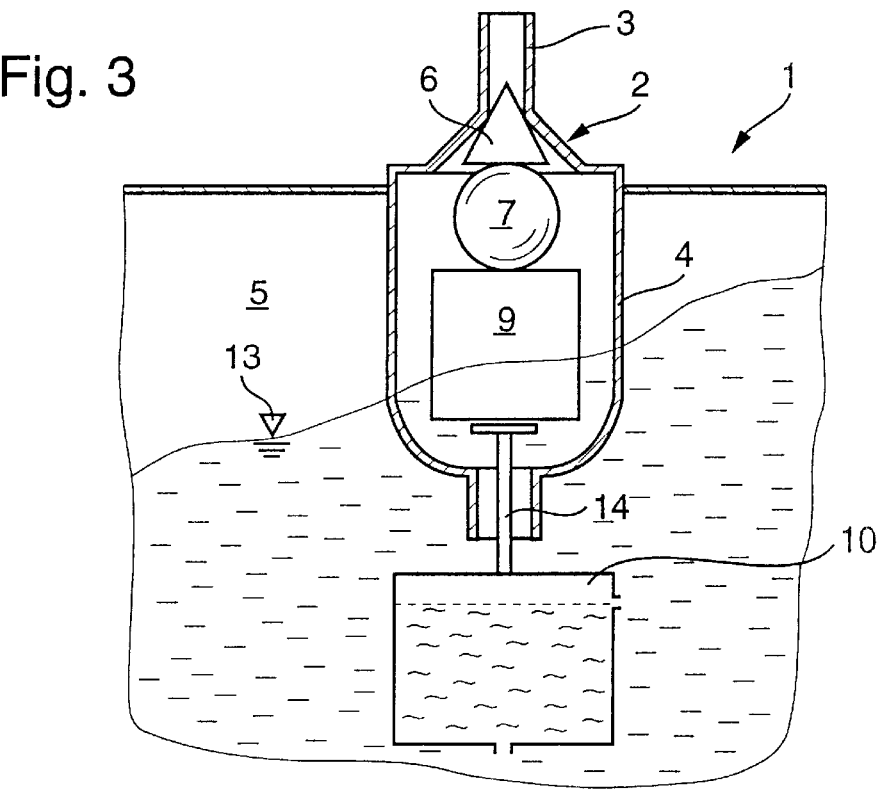
FIG. 3 shows the valve, based on the state of FIG. 2, when the fuel level is raised because the vehicle is negotiating a curve and, FIG. 4 shows the vent valve upside down during a vehicle roll-over accident wherein the vent valve closed by gravity forces.

The figures show schematically a section of a fuel tank 1 wherein FIGS. 1–3 show the tank 1 or rather the vent valve 2 in the normal position of the vehicle in which the tank 1 is installed but which is not shown in the drawings. The tank 1 has the vent valve 2 installed in the upper area thereof. The vent valve 2 includes a vent connection 3 which, by way of a vent pipe, which is not shown, is in communication for example with the intake system of an internal combustion engine, an activated carbon filter, or simply with the atmosphere. The vent connection 3, which is shown here as part of the housing 4 of the vent valve 2, that is in open communication with the interior 3 of the tank 1 can be closed by a closing element 6, which is shown in the drawings schematically as a cone member provided with a mass element 7. The mass element 7 is shown symbolically as a ball connected to the closing element 6. But the closing element 6 and the mass element 7 could of course be combined in a single element. The closing element 6 and, respectively, the mass element 7 are engageable by the float structure 8, which, in the embodiment shown, comprises two float elements 9 and 10, which are shown as hollow bodies. The float element 9 is fully closed; the float element 10 is provided with two throttling bores 11 and 12. The cross-section of the throttling bores 11 and 12 is so selected that the float 10 shown in the figures as hollow body can be filled or emptied slowly by way of one or the other of the throttling bores 11 and 12. "Slowly" is to be understood that it should take 5 to 15 minutes or even longer for the float element 10 to be filled or emptied by way of the throttle bores 11 or 12. This time may be longer or shorter depending on the time normally required for filling the tank of a particular vehicle.

Instead of a hollow body with throttling openings other types of float elements may be utilized such as foam or sponge like bodies, which have hollow volume capable of containing fuel and whose filling or emptying process takes comparable times such that they function as will be explained below on the basis of the figures.

FIG. 1 shows a particular tank filling state. The fuel tank generally designated with the reference numeral 1 is filled with fuel in the usual manner through a tank filled neck, which is not shown in the figure. During filling the fuel level in the tank rises slowly, while the volume between the tank top wall and the fuel surface becomes smaller. The vent valve 2 is open as shown in FIG. 2. The gases displaced from the tank during filling escape from the tank 1 by way of the vent connection 3 of the vent valve 2.

The tank 1 should not be filled completely so that a certain volume remains to accommodate temperature dependent volume changes of the fuel and to permit the discharge of air and gas by way of the vent valve without entrainment of fuel.

With regard to the situation as it exists during the tank filling procedure, the vent valve 2 protects the tank 1 from being over-filled as shown in FIG. 1: The vent valve 2 closes when the fuel volume has reached a certain level, that is, the level 13 as shown in FIG. 1, whereby the pressure in the tank is increased so that no additional fuel can be filled into the tank.

During refueling the float element 10 of the float structure 8 first comes into contact with the fuel. The float element 10 transmits its buoyancy force, by way of the symbolically shown link 14 to the other float element 9, which transmits the force to the mass body 7 and the closing element 6, which is moved thereby to its closing position. When the venting valve is closed additional fuel can still be filled into the tank until the gas in the top of the tank is sufficiently compressed so that no additional fuel can be filled into the tank even in small amounts. This protects the tank from being over-filled.

However, the vent valve must not be kept closed over an extended period of time since on undesirable pressure build-up in the tank should be prevented and degassification should be possible.

With regard to this consideration, the float element 10 is provided with throttling bores 11 and 12 so that, starting with a situation as represented in FIG. 1, the fuel level 15 within the float element 10 rises slowly until the situation as represented in FIG. 2 is reached, wherein the fuel level within the float element 10 is essentially the same as in the fuel tank 1. While the fuel level within the float element rises the float element sinks deeper into the fuel as it loses its buoyancy until the float element 10 is supported by the link 14.

The float element 9 is movable within the vent housing 4 and, since the fuel level 13 in the tank 1 is lower can move downwardly to its lower end position as shown in FIG. 2, in which the vent valve 2 is fully opened. Then communication is established between the interior of the fuel tank 1 and the vent connection 3 by way of the vent housing 4. Depending on the time period required for filling the float element 10 by way of the throttling bore 11, over-filling of the tank 1 is prevented, which also makes topping of the tank impossible. This time period must be at least as long as the time normally required for refueling the tank. Instead of the throttling bores 11, 12, the float element 10 may have fuel-permeable walls structures 11', 12' such as sieve structures as indicated in FIG. 1, or the float element may consist of a porous structure comprising an at least partially open foam or sponge-like structure.

It is important that the protection of the tank from over-fueling remains intact under all circumstances, even if the fuel level rises temporarily, while the vehicle is negotiating a tight curve, in order to safely prevent fuel from escaping through the vent valve. This situation is represented in FIG. 3, wherein a high fuel level is indicated. Here, the fuel level has reached a height wherein the float element 9 of the float structure 8 is immersed in the fuel and its buoyancy lifts the float structure 8, whereby the vent valve 2 is closed by the closing element 6.

FIG. 3 shows that this function—overflow protection when negotiating curves—is insured independently of the original position of the float element 10. Assuming a position as indicated in FIG. 2, wherein the float element 10 is filled with fuel and has little buoyancy as it may occur with a vehicle negotiating a curve with a filled tank, the float element 9 is immersed in the fuel and provides the buoyancy needed to close the vent valve 2 by the closing element 6. If the vehicle negotiates a curve after the float element 10 is already empty the float element 10 provides the buoyancy force necessary to close the vent valve aided, if applicable, by the buoyancy force of the float element 9.

Figure 4:
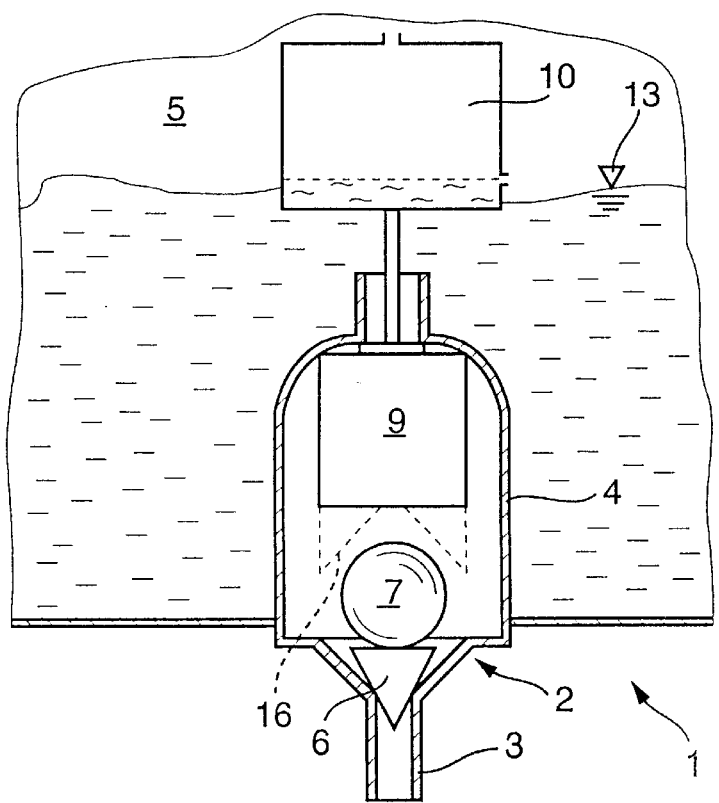

In addition to over-fueling protection and overflowing of the fuel when the vehicle is negotiating a curve or is in an inclined position, the venting valve according to the invention also prevents the spilling of fuel during a roll-over accident. This situation is shown in FIG. 4, where the tank is shown up-side down so that the vent valve 2 with its venting connection 3 is disposed at the bottom. In such a position the vent valve 2 is disposed below the fuel level 13 in the fuel tank 1. If this happens, the buoyancy forces of the float elements 9 and 10 are in a direction opposite to the valve closing directions. However, the valve is closed in this position by the mass body 7, which then is disengaged from the float element 9.

The guide arrangement for the float structure 8 in the housing 4 is shown in the figures only schematically. The drawings also leave it open how the float element 9 is arranged for example with respect to the mass body 7 or the closing element 6 in all positions of the vehicle. However, for an example, the float element may be formed at its end face adjacent the mass body 7, so as to provide guide functions for the mass body 7 as it is shown in FIG. 4 by dashed lines, which indicate a pot-like shape of the front end surface 16.

It is pointed out that the representation also of the float structure with the float elements 9 and 10 is only symbolical and that it is possible of course to combine the two float elements in a way that they fulfill the function outlined above.

What is claimed is:

1. A fuel tank for motor vehicles including: a vent connection with a venting valve which automatically closes when the fuel in the tank reaches a predetermined level and also when the vehicle is in an upside down position, said venting valve including a vent closing member with a mass element for opening said vent closing member, a float structure adapted to engage said vent closing member for closing said vent connection, said float structure including a first float element including throttle openings permitting fuel to enter said first float element such that its buoyancy is variable with an amount of fuel contained therein, a separate second, closed float element which is disposed on top of, and movable relative to, said first float element to ensure closing of the vent connection when fuel reaches said second float element and said first float element has lost its buoyancy by fuel that has entered said first float element through said throttle openings, said vent closing member being disposed adjacent to, and engageable by, said second float element for closing said vent connections, said vent closing member being heavier than fuel and being movable independently of said second float element so that, in an upside-down position, said vent closing member will sink to close said vent connection.

2. A fuel tank according to claim 1, wherein the buoyancy volume of said first float element depends on the fuel level in said tank, the immersion depth and duration of immersion of the float structure in the fuel.

3. A fuel tank according to claim 1, wherein said variable first float element is formed by an at least partially open-pore foam or sponge-like structure.

4. A fuel tank according to claim 1, wherein fuel permeable wall structures are provided as throttle openings in said variable volume first float element.

5. A fuel tank according to claim 4, wherein said fuel permeable wall structures are sieve-like wall areas.

6. A fuel tank according to claim 1, wherein a first throttle opening is provided in a bottom portion of said first float element and a second throttle opening is formed in an area of said first float element adjacent the top end thereof.

* * * * *